Sept. 2, 1958       J. M. HILL       2,850,147
MOBILE CURVABLE CONVEYOR
Filed Aug. 20, 1954       11 Sheets-Sheet 1

INVENTOR.
JAMES M. HILL
BY William B. Jaspert
Attorney.

Sept. 2, 1958　　　J. M. HILL　　　2,850,147
MOBILE CURVABLE CONVEYOR
Filed Aug. 20, 1954　　　11 Sheets-Sheet 3

INVENTOR.
JAMES M. HILL
BY William B. Jaspert
Attorney.

Sept. 2, 1958 J. M. HILL 2,850,147
MOBILE CURVABLE CONVEYOR
Filed Aug. 20, 1954 11 Sheets-Sheet 4

INVENTOR.
JAMES M. HILL
BY
William B. Jaspert
Attorney

INVENTOR.
JAMES M. HILL

Sept. 2, 1958          J. M. HILL          2,850,147

MOBILE CURVABLE CONVEYOR

Filed Aug. 20, 1954          11 Sheets-Sheet 7

INVENTOR.
JAMES M. HILL
BY William B. Jaspert
Attorney.

Sept. 2, 1958  J. M. HILL  2,850,147
MOBILE CURVABLE CONVEYOR
Filed Aug. 20, 1954  11 Sheets-Sheet 9

Fig. 21

INVENTOR.
JAMES M. HILL
BY
William B. Jaspert
Attorney.

Sept. 2, 1958 J. M. HILL 2,850,147
MOBILE CURVABLE CONVEYOR
Filed Aug. 20, 1954 11 Sheets-Sheet 10

INVENTOR.
JAMES M. HILL
BY William B Jaspert
Attorney

Sept. 2, 1958 J. M. HILL 2,850,147
MOBILE CURVABLE CONVEYOR
Filed Aug. 20, 1954 11 Sheets-Sheet 11

INVENTOR.
JAMES M. HILL
BY William B. Jaspert
Attorney.

United States Patent Office 2,850,147
Patented Sept. 2, 1958

2,850,147

MOBILE CURVABLE CONVEYOR

James M. Hill, Morgantown, W. Va.

Application August 20, 1954, Serial No. 451,133

6 Claims. (Cl. 198—109)

This invention relates to new and useful improvements in conveyor mechanism for continuous mining machines to convey the mined material to a receiving station, such as a main portal conveyor, and the present application is a continuation-in-part of my applications Serial Nos. 355,561, filed May 18, 1953; 360,715, filed June 10, 1953; 367,636, filed July 13, 1953; 385,330, filed October 12, 1953; and 399,705, filed December 22, 1953, heretofore filed by me.

It is among the objects of this invention to provide a conveyor that is mobile and curvable and adapted to follow the mining machine, without tracks, around curves, through corridors and rooms.

It is a further object of the invention to provide conveyor mechanism of the above-designated character in which the conveyor support or chassis consists of a plurality of articulated body pans, some or all of which are supported on wheeled axles and which are associated with a flexible spine or drawbar in a manner to permit the body pans to chord relative to the longitudinal axis of the drawbar, whereby the conveyor in following the mining machine will adapt itself to the curves either vertical or horizontal without binding.

It is still a further object of the invention to provide a conveyor chassis construction in which the flexible body or drawbar is attached to the body pans at intervals and reinforced, if desired or necessary, to control the degree of flexing and thereby smooth out the curves of the conveyor as it passes around corners, and in which the drawbar is the sole element subjected to tension or compression in pulling or pushing the conveyor.

It is another object of the invention to provide a conveyor in which the body pans are provided with overlapping ends offset and spaced by pin and slots or larger holes to provide free directional movement within the limits of desired curvature of the flexible body pan supports.

A further object of the invention is the provision of hanger plates integrally joined or cast on the conveyor body pans, having slotted portions coacting with the flexible drawbar to permit angling of the body pans relative to the vertical or horizontal curvature of the flexible support, said hanger plates constituting chairs by which the pans are supported on the drawbar.

It is still a further object of the invention to provide U-shaped body pans that form a continuous channel from the mining machine to the end of the conveyor for an endless conveying element with longitudinally spaced drag flights for conveying the mined material, and roller supports providing antifriction mounting and for guiding the drag flights and conveyor elements.

It is still a further object of the invention to provide conveyor mechanism in which the conveying elements consist of movable trays mounted on conveyor flights with suitable guide means for supporting them on a chassis consisting of articulated frame members having wheel supports and having a flexible drawbar for adapting the chassis sections to the curvature of travel of the conveyor in following the continuous mining machine to which it is attached.

A further object of the invention is the provision of improved conveyor links to which the drag flights or conveying pans are attached. These and other objects of the invention will become more apparent from a consideration of the accompanying drawings constituting a part hereof in which like reference characters designate like parts and in which;

Figure 1:
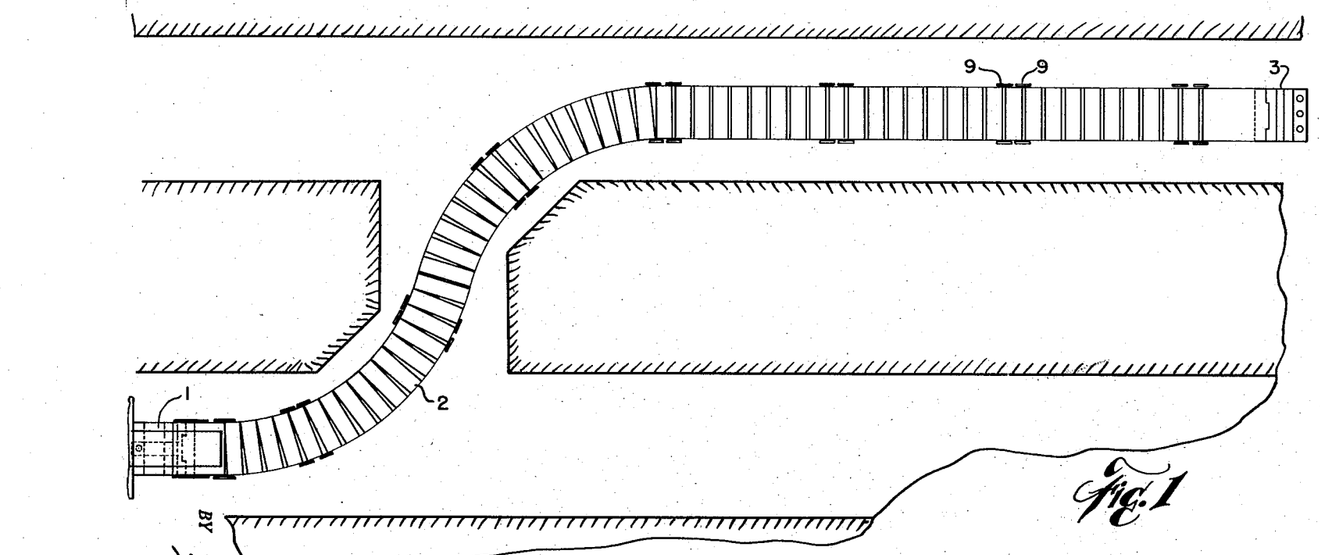
Fig. 1 is a top plan view diagrammatically illustrating a continuous mining machine and conveying mechanism therefor embodying the principles of this invention.

In Fig. 1 is shown a continuous mining machine designated by the reference character 1 having attached thereto an endless conveyor generally designated by the numeral 2, terminating in a loader 3, the conveyor passing through the corridors and room in the path of travel of the mining machine 1 without the use of tracks.

Figure 3:
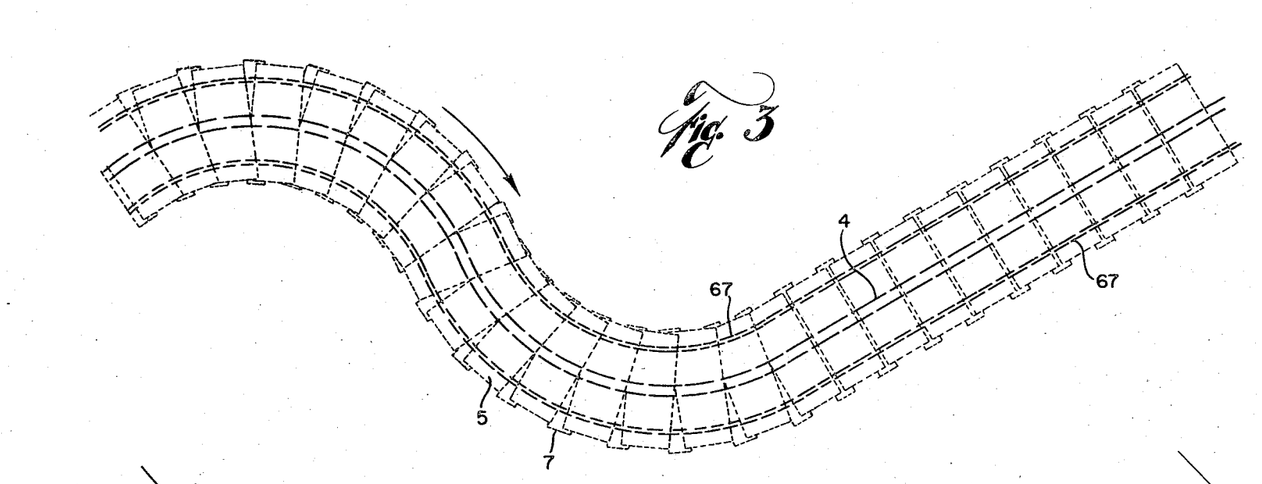
Fig. 3, a top plan view of a conveyor mechanism diagrammatically illustrating the overlap of the body pans or conveyor pans and a flexible drawbar supporting said pans, the latter being shown in dotted lines running centrally of the conveyor.

In accordance with the present invention, the vertical and horizontal curvature of the conveyor is controlled by means of a flexible spine or drawbar generally designated by the numeral 4 in Fig. 3 of the drawing, the conveyor sections being so mounted on and supported by the drawbar that they will conform to the curvature of the drawbar without binding or in any manner interfering with the coal conveying mechanism.

Figures 7, 8, 9:
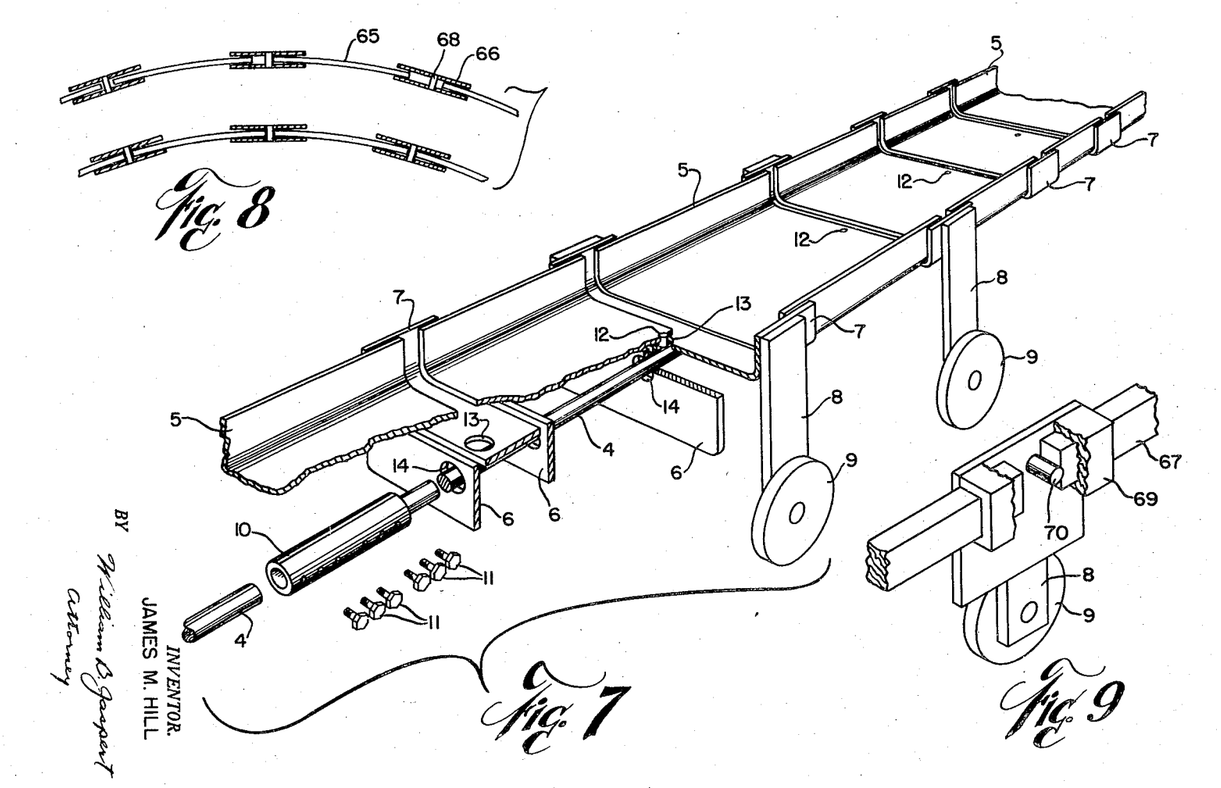
Fig. 7, a view in perspective of the conveyor chassis, flexible drawbar and drawbar coupling.
Fig. 8, a top plan view partially in elevation, of stiffener bars employed in the chassis structure.
Fig. 9, an isometric view partially cut away, of the stiffener bars and mounting therefor.

The relation of the drawbar with the other supporting elements of the conveyor is best shown in Fig. 7 of the drawing in which a plurality of U-shaped body pans 5 having hanger plates 6, rest on the drawbar 4, the body pans 5 being provided with a U-strap 7 at one end for receiving the overlapping end of the adjacent body pan. At intervals, the body pans are provided with wheeled supports 8 having wheels 9 on which the conveyor frame is movable in following the continuous mining machine. It will be noted that the flexible drawbar 4 may be made in sections which are spliced by inserting the ends in a sleeve 10 to which they are fastened by set screws 11, said sleeves being secured as by welding to pans 5, and the total spliced drawbar sections are the equivalent of a continuous integral drawbar extending the length of the conveyor.

Figure 4:
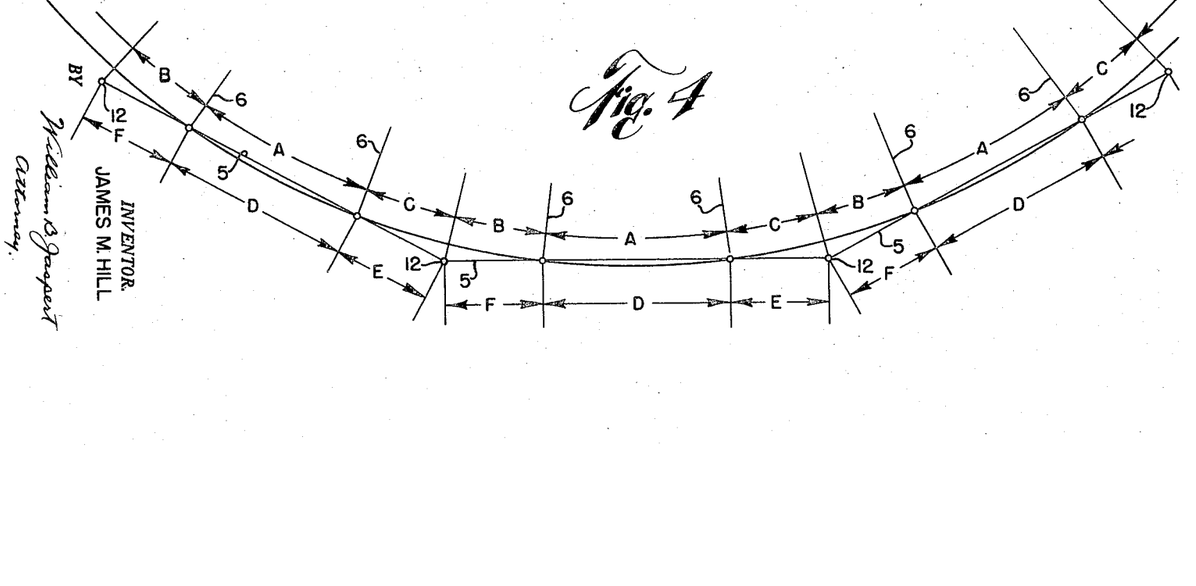
Fig. 4, a diagrammatic illustration of a curve representing the flexible drawbar and cords and externals representing centerlines of the conveyor chassis or body pans in relation to the flexible drawbar.

A highly important feature of the invention is to provide for free articulation of the body pans 5 which is accomplished by a guide pin 12, Fig. 7 welded to or integrally formed with one end of the body pan and which extends through a circular or other shaped opening 13 of the U-strap 7 that overlies the pinned end, as is clearly shown in Fig. 7. By this construction, the overlapping ends of the body pans 5 are freely movable, as distinguished from a pivoted or hinged joint, so that they may adapt themselves to the curvature of the drawbar 4. The free articulation of the body pans to conform with the flexible drawbar is diagrammatically illustrated in Fig. 3 of the drawings and is demonstrated by the diagram of Fig. 4, wherein the curved centerline 4 represents the flexible drawbar and the straight lines 5 designate the length of the center line of the U-shaped body pans. By means of the clearance slot 13 around the guide pan 12, Fig. 7, the pans 5 which are the cords to the curve 4, Fig. 4, are of the same length in the distance F, D and E as is the corresponding portion of the curvature of the drawbar designated by the characters A, B and C. The points of articulation between pans are shown at 12, Fig. 4, and the points of support of the pans 5 where the hanger plates 6 rest on the drawbar 4 are shown at 6, Fig. 4. This is essentially so to eliminate binding of the body pans either on a vertical or horizontal curve.

Figure 5:
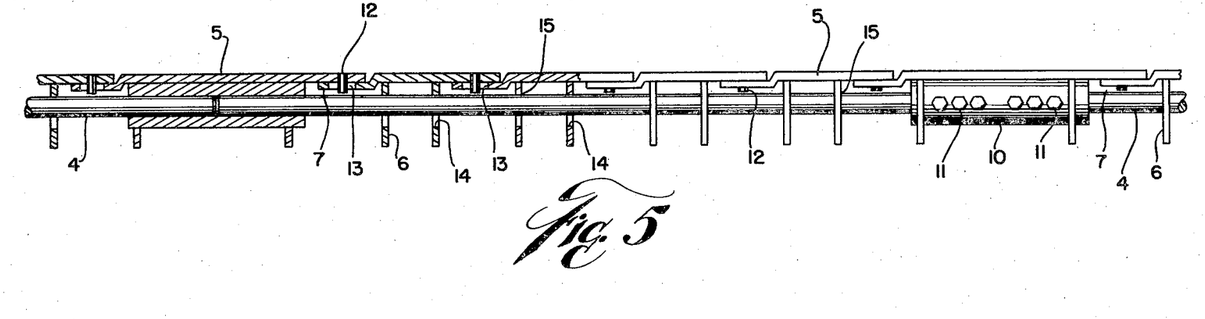
Fig. 5, a diagrammatic illustration of the conveyor chassis including the body pans and flexible drawbar.

Another element contributing to the free articulation of the pans is the clearance provided by the opening 14 in hanger plate 6 underneath the body pans, as shown in Fig. 7. This relationship of the body pans to the drawbar for free articulation is diagrammatically illustrated in Fig. 5 of the drawing showing the drawbar 4 with the splicing sleeves 10, the underlying U-strap 7 with the clearance hole 13 around the guide pin 12 on the overlapping ends of the pan 5. Fig. 5 also shows the hanger plates 6 with the clearance opening 14, these hanger plates resting on the drawbar 4 but making contact as shown at 15. Thus Fig. 5 demonstrates the relationship of the essential elements of the conveyor, namely, the flexible drawbar, the body pans supported on said drawbar and overlapping at their ends which are guided by the guide pin 12 in the clearance slot 13.

Figure 6:
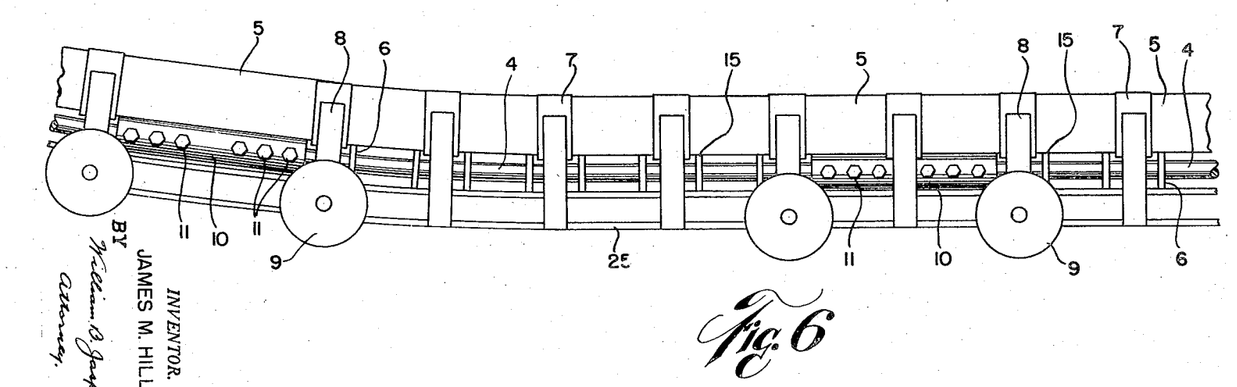
Fig. 6, a side elevational view of the conveyor chassis on its wheeled supports.

In Fig. 6 the conveyor structure is shown supported by pairs of wheels 9 attached to the U-straps 7 by the legs 8, the intermediate pans between the spliced ends of the drawbars being supported only by the flexible drawbar 4.

Figure 2:
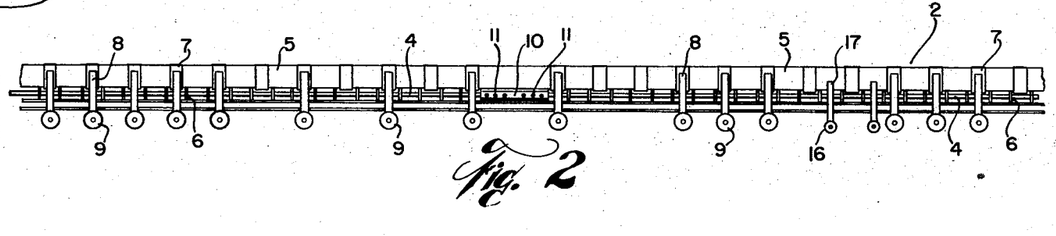
Fig. 2, a side elevational view of a conveyor mechanism diagrammatically illustrating various modifications of wheel supports.

The same double wheeled arrangement at the spliced joints of the drawbar is shown in Fig. 1 of the drawing. However, as shown in Fig. 2, each of the body pans may be provided with a wheeled support 8 or they may be spaced closer than in the span of pans shown in Figs. 1 and 6. Also, smaller wheels 16 may be attached to the body of the pan by a wheel support 17, as shown in Fig. 2 of the drawings, the manner of applying the wheels to the conveyor elements being a matter of choice as to size and numbers and their place of application.

Figure 10:
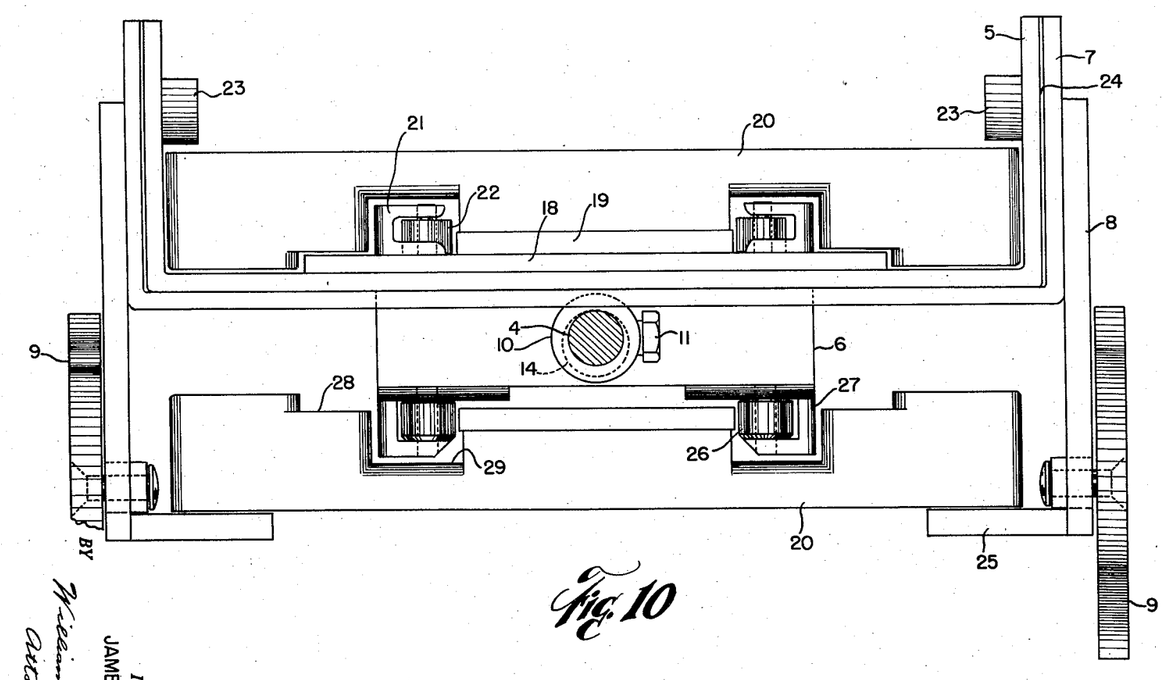
Fig. 10, an end elevational view of the conveyor structure illustrating the body pans, the drag flights, the wheel supports and the flexible drawbar.

The above-described conveyor structure employing the body pans 5 constitutes an endless chute made up of articulated U-shaped sections through which the coal or mined material is conveyed by means of drag flights attached to an endless conveyor chain such as is shown in Fig. 10 of the drawing which will now be described.

Figures 18, 19, 20:
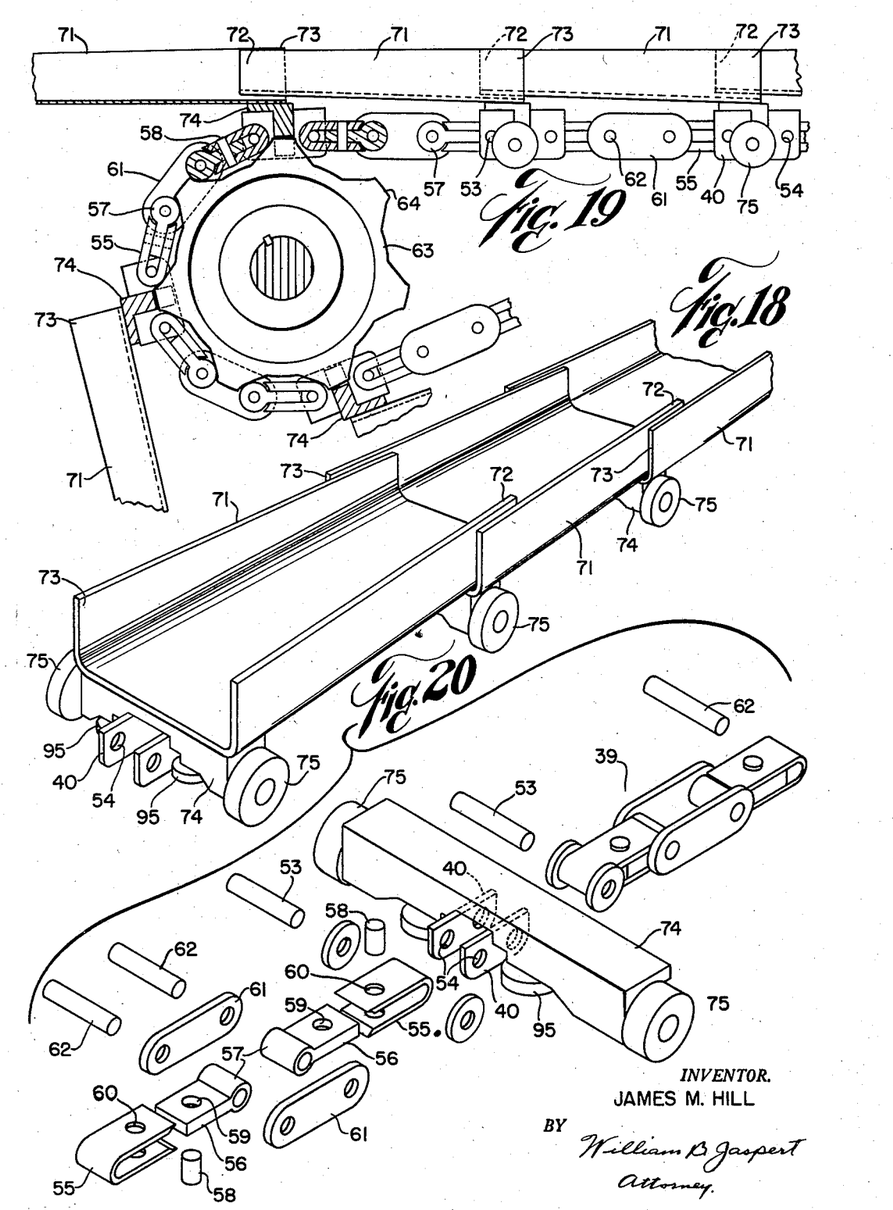
Fig. 18, a view in perspective of a conveyor mechanism embodying movable conveyor pans.
Fig. 19, a side elevational view, partially in cross section, of a drive for the pans shown in Fig. 18.
Fig. 20, an exploded view and partial assembly of the conveyor chain drive of Fig. 19.

The U-shaped pan 5 is shown as provided with a wear plate 18 which may be integrally formed or secured by welding, the wear plate supporting a shoe 19 of a drag flight 20, which is preferably a bar such as shown in Fig. 20 of the drawing. Mounted on the wear plate are brackets 21 in which rollers 22 are journaled for guiding the drag flight bars 20 by engagement with the shoe 19. The body pans 5 are provided with hold down bars 23 that prevent the drag flight bars 20 from being displaced in a vertical direction. The U-straps 7 are shown as extending the full width of the body pans 5 and also to the top of the side walls thereon and are preferably joined to the body pans by welding along their edges, as shown at 24. The wheel supports or legs 8 are similarly welded to U-straps 7 and the wheel supports 8 are provided with a bar 25 integrally attached thereto, as by welding. The bar 25 constitutes a guide for the return drag flight bar 20 as shown in Fig. 10 and the bars 20 may be guided on their return movement by guide rolls 26 that are journaled in brackets 27 attached to the underside of the hanger plates 6, more clearly described in connection with Fig. 7 of the drawing. The drag flight bars 20 are cut out or notched at 28 and 29 to clear the wear plate 18 and the roller brackets 21 and 27.

The wheel supports 8 are attached to the U-straps 7 as shown in Fig. 7, which is directly below the overlap of the body pans 5 whereby the load on the overlapping end of the body pan is supported.

Figure 11:
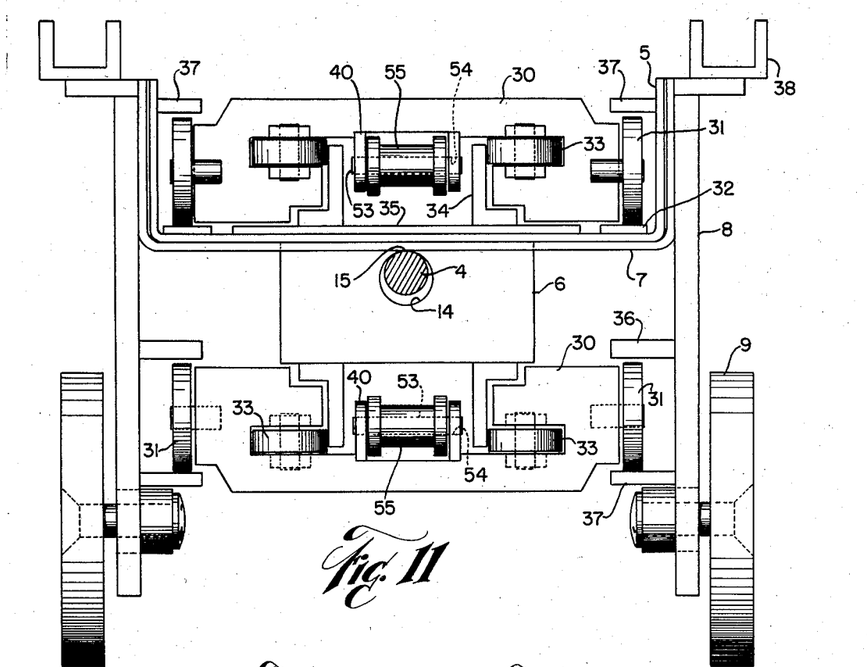
Fig. 11, a similar view showing a modification of the structure of Fig. 10.
Figures 12, 13, 14, 15, 16:
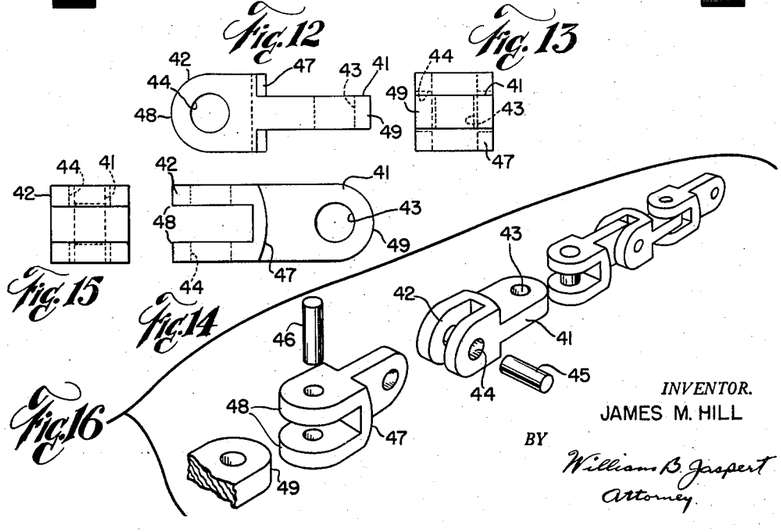
Fig. 12, a top plan view of a conveyor link employed in the structure of Fig. 11.
Fig. 13, an end elevational view thereof.
Fig. 14, a side elevational view of the link shown in Figs. 12 and 13.
Fig. 15, an end elevation viewing the link of Fig. 14 from left to right of the drawing.
Fig. 16, an exploded view, a partial assembly of the conveyor links and pins shown in Figs. 12 to 14.

Fig. 10 shows the end of the splice sleeve 10 in which the ends of the flexible drawbar 4 are secured by the set screws 11. The circle 14 shows the clearance in the hanger plate 6 which rests upon the flexible drawbar 4 as shown in Fig. 10. In Fig. 11, a modified form of draw flight bars is shown designated by the numeral 30, which is provided with guide wheels 31 rolling on a track bar 32 and with guide rolls 33 that engage angles 34 mounted on a plate 35 welded to the U-shaped body pan 5. The same construction of U-strap 7, as in the form shown in Fig. 10, is utilized and the wheel support or leg 8 is provided with the wheels 9 and also guide bars 36 and 37 between which the wheels 31 of the drag flight bars 30 pass on the return movement of the drag flight members. Channels 38 may be provided on the top of the legs 8 to constitute a track for wheels such as the wheel 9, when the end of one conveyor is superimposed upon another conveyor to make up any desired length of conveying mechanism in a particular mining operation.

The drag flights are connected to a conveyor chain generally designated by the numeral 39, which is pivotally mounted to lugs 40 provided on the drag flights to which they may be secured, as by welding. One type of links for chain 39 is shown in Figs. 12 to 16 inclusive, and in Fig. 17 of the drawing and consists of members cut from rectangular stock to have a tongue end 41 and a bifurcated end 42, both provided with pin openings 43 and 44 respectively for receiving pins 45 and 46. These links are interchangeable, as appears from the assembly on the righthand end of Fig. 16 of the drawing. The bifurcated end portions of the links are rounded as shown at 47 and 48, Figs. 12 and 14, and the tongue ends are rounded, as shown at 49, to provide rounded faces that co-act with the curved faces 50 of a sprocket wheel 51, Fig. 17, the teeth engaging the links between the rounded faces 47 and 49 in the manner shown. Lugs 52 are welded at intervals to the links of the endless conveyor chain to which the drag flight bars 20 and 30 are secured by welding and in the form of the device shown in Fig. 11, a roller type chain is employed which is secured to the drag flight 30 by pins 53 extending through the openings 54 of the lugs 40, as shown in Fig. 20 of the drawing.

The type of chain of Fig. 11 is shown in the exploded view in Fig. 20 and consists of U-shaped links 55 that slide over the shanks 56 of the cylindrically ended links 57 with pins 58 joining them through the openings 59 and 60. Side links 61 are secured across the cylindrical ends 57 of adjacent links and joined by pins 62, the assembled link being shown at the righthand end of Fig. 20 of the drawing. This type of chain is driven by a sprocket wheel 63 having teeth 64 that engage the rolled ends of adjacent links, as shown in the cross section at the top of Fig. 19 of the drawing.

Figure 25:
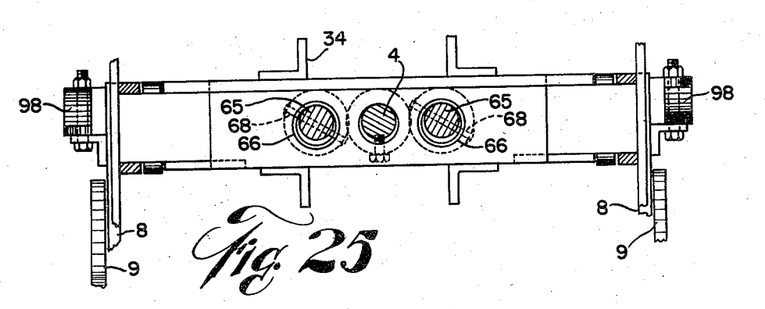
Fig. 25, a vertical section partially in elevation, of a conveyor chassis on wheel supports having a flexible drawbar and a plurality of stiffener rods mounted therein.
Figure 26:
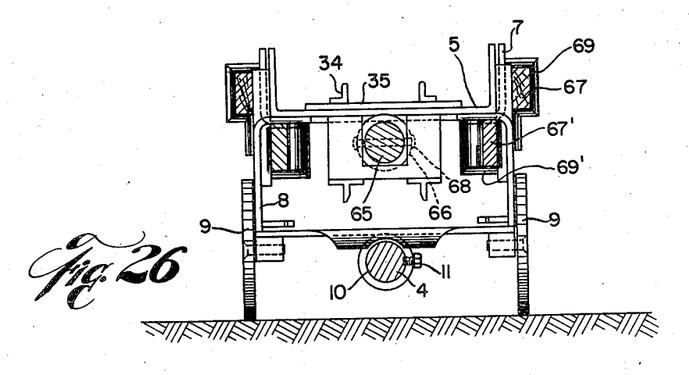
Fig. 26, a similar view emboying a modified form of stiffener bars.
Figure 27:
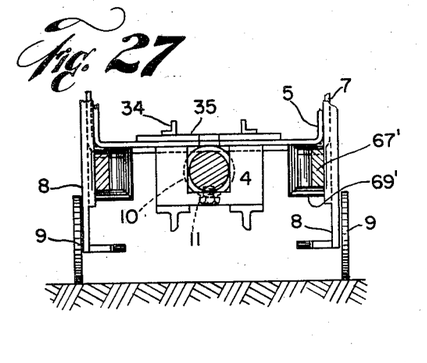
Fig. 27, a vertical section, partially in elevation, of a portion of the conveyor chassis shown in Fig. 26; and, Fig. 28 a fragmentary view in side elevation of a conveyor showing fender blocks.

As shown in Figs. 25, 26 and 27, stiffening pieces may be employed to regulate the degree of flexing of the flexible draft bars 4. In the form of the device shown in Fig. 25, cylindrical rods 65 may be employed which are mounted in tubes 66 in which they are freely slidable. Instead of the cylindrical rods 65 of Fig. 25, rods 67 of rectangular cross section, as shown in Figs. 26 and 27, may be employed. As shown in Figs. 8 and 9, the stiffening rods such as the cylindrical rods 65 have their ends disposed in the tubing 66, Fig. 8, with pins 68 constituting end abuments or stops extending through the tubes. The rod sections between adjacent tubes may thus freely slide in the tubes, as shown in Fig. 8, without causing any binding of the body pans and drawbar when the conveyor is passed around a curve.

In the use of the rectangular stiffening rod 67, they may be disposed in rectangular tubing 69 as shown in Figs. 9 and 26 with the end abutting pins 70 constituting stops for limiting the movement of the bars 67. Also, as shown in Fig. 26, the ends of rectangular stiffening rods 67′ may be in overlapping relation in their retainers 69′.

Figure 17:
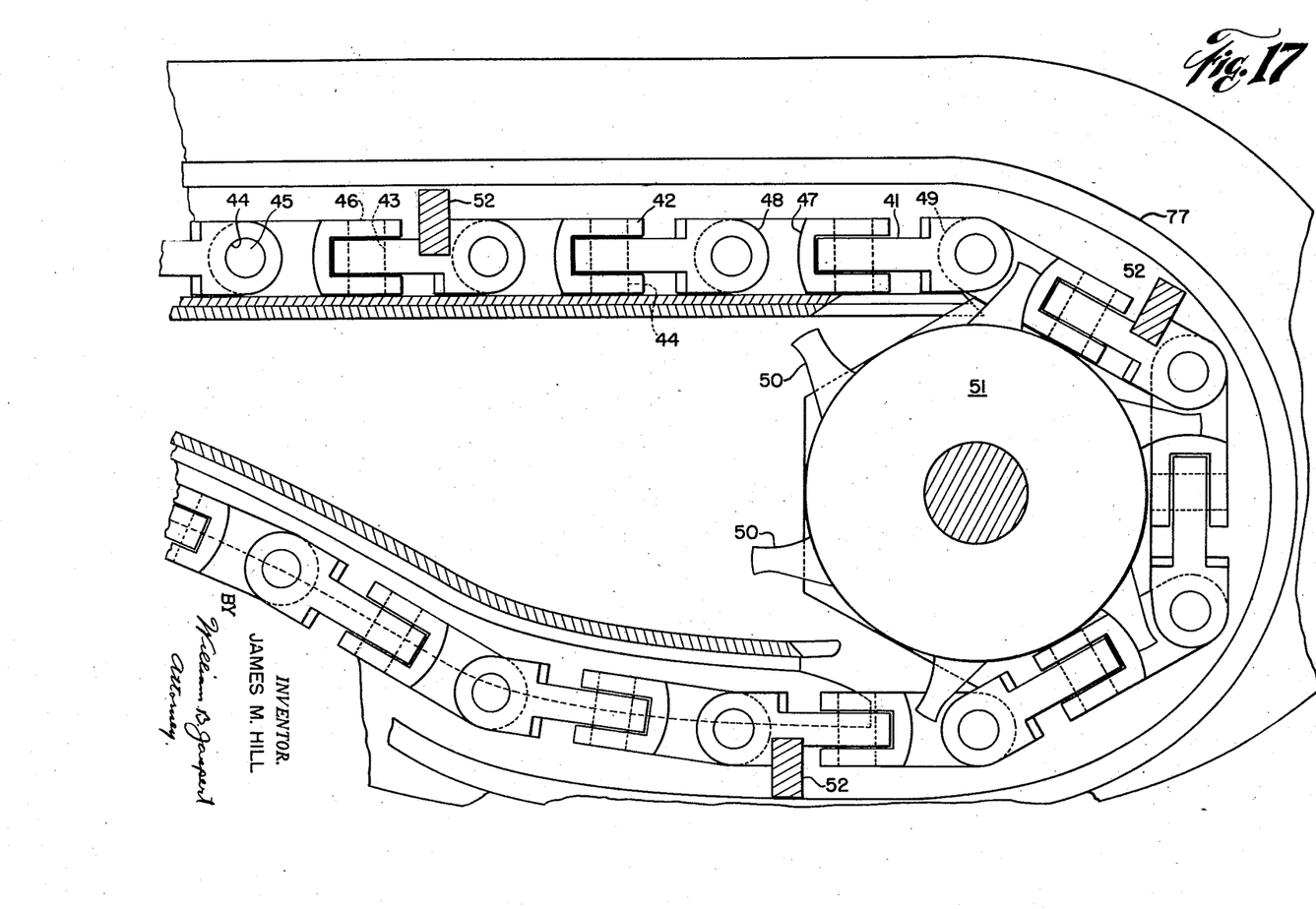
Fig. 17, a side elevational view of a conveyor chain and drive drum therefor, embodying the links of Figs. 12 through 16.

In the form of the conveyor structure hereinbefore described, the coal is conveyed by the drag flights through the U-shaped body pans with the flexible drawbar and the guided articulated joints of the pin controlling the posture of the conveyor structure relative to the curves and turns in a mine. The same principle of flexible drawbar may, however, be utilized in a movable pan type of conveyor, as is shown and will be described in connection with Figs. 18 through 24 inclusive, of the drawings. As shown in Fig. 18, the conveying pans designated by the numeral 71 are of slightly dove-tail shape in their transverse dimension with the small end 72 of the pan overlapping the wide end 73 of the adjacent pan. The wide end of the pan is welded to a cross flight bar disignated by the numeral 74 having guide wheels 75. This is more clearly shown in Fig. 21 of the drawing in which the guide rollers 75 travel on track bars 76 and are restrained against upward movement by guide bars 77. As shown in Fig. 17, the hold down bars 77 extend around the conveyor drum 51 to guide wheels 31 and 75 and prevent the conveyor chain from jumping out of teeth 50.

Figure 21:
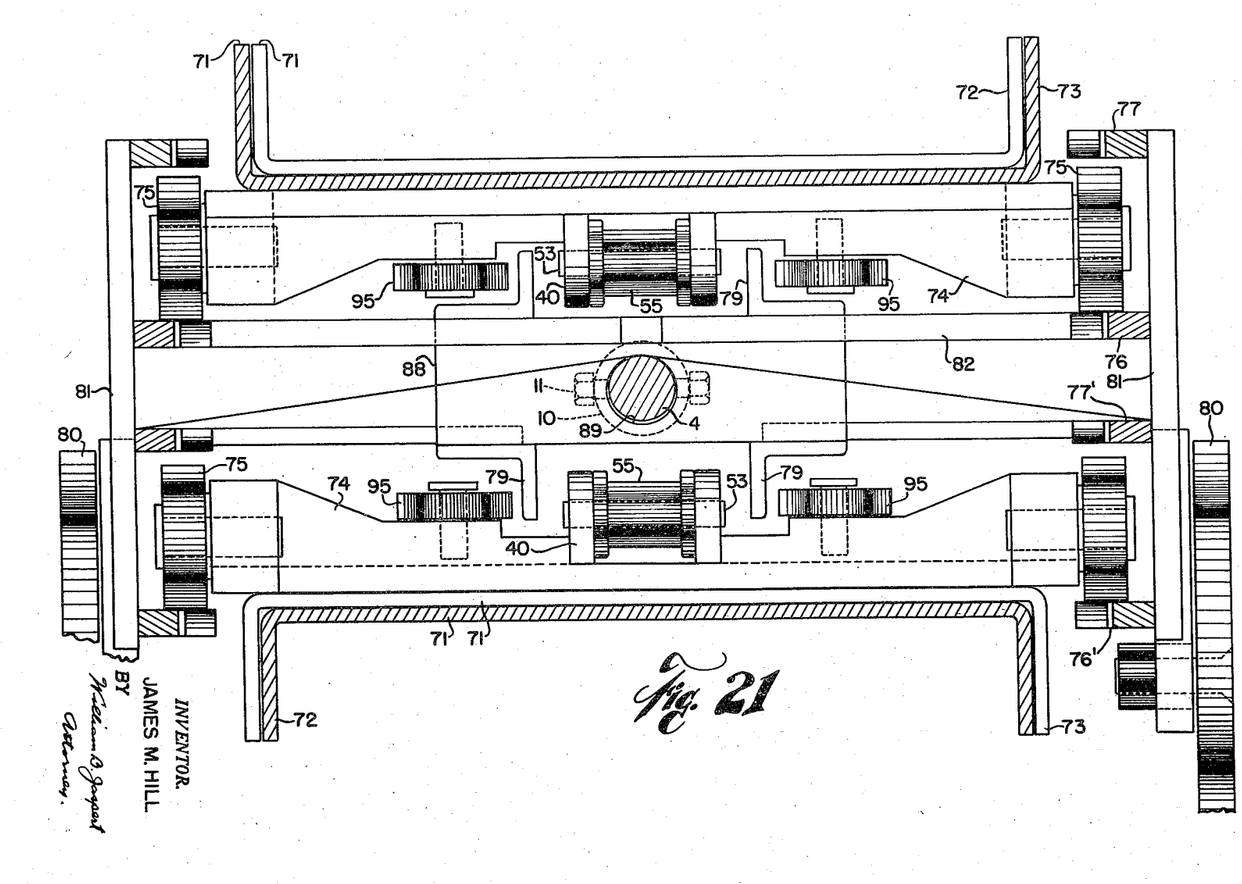
Fig. 21, a vertical cross section, partially in elevation, of the movable pan type of conveyor shown in Fig. 18.
Figure 22:
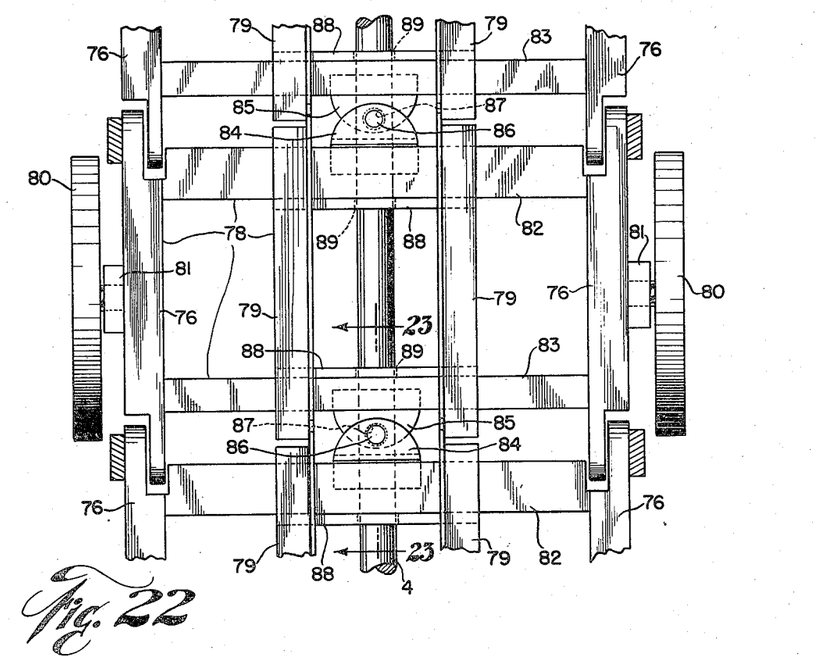
Fig. 22, a top plan view of the chassis frame of the movable chain type conveyor shown in Figs. 18 and 21.
Figure 23:
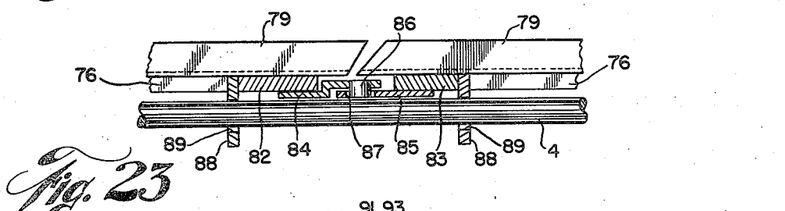
Fig. 23, a partial vertical cross section and elevational view of the chassis frame and flexible drawbar taken along the line 23—23 of Fig. 22.

The same principle of employing the flexible drawbar 4, as in the case of the fixed body pans, is utilized in the conveyor pan type in connection with a frame structure that constitutes the chassis of the conveyor. This frame structure is shown in Figs. 21 and 22 and consists of longitudinal frame members 76, 77 and 79 and transverse frame members 82 and 83 supported on wheels 80 by means of the wheel supporting bars 81 that are attached to the track bars 76 and 77. Cross bars 82 and 83 are joined to the track bars 76, as by welding, and overlapping coupling pieces 84 and 85 are welded to the bars 82 and 83 respectively. As shown in Fig. 23, the coupling 84 is provided with a guide pin 86 and the coupling 85 with a circular opening 87 that provides a substantial clearance for the guide pin 86 to prevent a binding when the frame is articulated in response to the curvature of the flexible drawbar 4. As shown in Fig. 23, hanger plates 88 are secured to the cross bars 82 and 83, respectively, and are provided with sufficient clearance in the opening 89 through which the flexible drawbar extends to permit relative vertical movement of the chassis frame and drawbar. The hanger plates 88 of the cross bars 82 and 83 rest upon the flexible drawbar 4 in the same manner as did the hanger plates 6 of the body pans.

Figure 24:
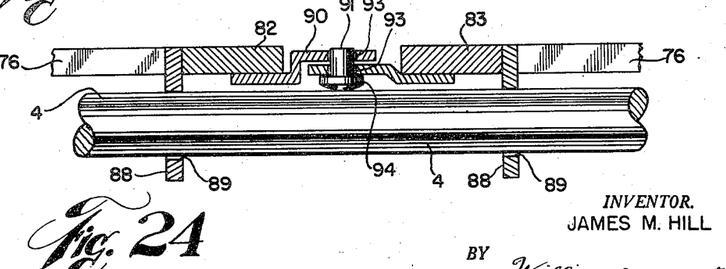
Fig. 24, a modified form of the chassis frame structure shown in Fig. 23.

In the modification shown in Fig. 24, cross bars are provided with a different type of coupling elements offset to overlap these elements being designated by the numerals 90 and 91. A guide pin 92 is loosely fitted in openings 93 of the coupling pieces, providing substantial clearance for movement of the pin, the pin being retained in the openings 93 of the coupling elements by a large head 94 that rests upon the flexible drawbar 4.

Figure 28:
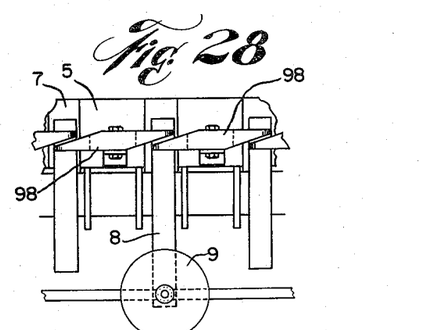

As shown in Figs. 22 and 23, the center frames 79 overlap so that the guide wheels 95 have an uninterrupted track in passing over successive frame sections to prevent binding of the movable conveyor on the frame. Side frames 77′ and 76′ support the return strand of the conveyor element and the flight bars 74 are coupled to a conveyor chain such as is shown in Fig. 20 by the pin 53 that extends through the lugs 40. The overlapping of the pans is shown in Figs. 18 and 19. Where a link type chain of the kind shown in Fig. 17 is employed, the conveyor pan 72 may be secured to the flight bars 52 as by welding. As shown in Figs. 25 and 28, individual fender blocks 98 may be secured to opposite sides of the conveyor frames or pans to clear the frames and wheels from any obstruction in the path of the conveyor.

In the operation of either the body pan drag flight conveyor or the movable pan type conveyor, the principle of maintaining alignment of the body pans or the chassis frame by supporting them on a flexible drawbar while being freely articulated at their overlapping ends is the same, this being the primary feature of the invention. By means of the continuous flexible drawbar supplemented by the stiffening rods 65 or 67 the conveyor, when attached to the continuous mining machine, will assume the curvatures resulting from the passing of the machine from one corridor to a room or through another corridor into a section to be mined without causing the conveyor support or the movable elements to bind in their operating functions. Because the flexible drawbar supports the body pans or chassis sections, as the case may be, it may be considered the main frame of the conveyor that acts as a spine in guiding the conveyor structure through mine openings. This is best illustrated in the diagrammatic views of Figs. 1, 3 and 5. Also where the drawbar 4 is employed, it is the only element of the conveyor by which it can be pulled or pushed in its travel through a mine.

As has been demonstrated by the various modifications of body pan, chassis and conveyor structures, the employment of a flexible drawbar as and for the purpose herein described provides for a wide range of structural designs so long as the articulated conveyor members are freely movable and not pivotally connected in a manner to constitute the flexible drawbar a strut. For example, when the conveyor is drawn or pushed at a work site the body pans or chassis sections are not in tension or compression because of the function of the flexible drawbar.

Although several embodiments of the invention have

I claim:

1. In a trackless mobile conveyor, a conveyor support and guide comprising a plurality of articulated chassis sections joined to be relatively movable in longitudinal, lateral and vertical directions, some of said sections being mounted on wheels, a unitary flexible drawbar extending the length of the conveyor and attached at both ends thereof, said drawbar being of uniform cross-section and resilient so as to flex in at least a vertical and a horizontal plane and permit a uniform curvature of the sections, the resilience of the drawbar tending to restore the sections to a straight line position, and being mounted to engage said chassis sections to steer the same when the conveyor is drawn in a longitudinal direction, and an endless conveyor movable over said chassis sections.

2. A trackless mobile conveyor structure as set forth in claim 1 characterized by the chassis sections having anti-friction guides and the endless conveyor movable over said chassis sections having guide faces for engaging the anti-friction guides of said chassis sections.

3. In a trackless mobile conveyor, a conveyor support and guide comprising a plurality of articulated body pans joined to be relatively movable in longitudinal, lateral and vertical directions, some of said pans being mounted on wheels, a unitary flexible drawbar extending the length of the conveyor and attached at both ends thereof, said drawbar being of uniform cross-section and resilient so as to flex in at least a vertical and a horizontal plane and permit a uniform curvature of the body pans, the resilience of the drawbar tending to restore the body pans to a straight line position, and being mounted to engage said body pans to steer the same when the conveyor is drawn in a longitudinal direction and an endless conveyor movable through said body pans.

4. In a trackless mobile conveyor, a conveyor support and guide comprising a flexible drawbar extending the length of the conveyor, a plurality of articulated frame sections having overlapping ends and joined to be relatively movable in longitudinal, lateral and vertical directions, some of said sections having wheeled supports and others of said sections having depending members resting upon said drawbar, said overlapping section ends having spacer pins in loosely fitting holes interacting to allow alignment of said sections and to provide free articulation of the frame sections in response to any curvature of the flexible drawbar, said drawbar consisting of a plurality of steel rods with their ends spliced to constitute a composite unitary drawbar, said spliced portions comprising a sleeve for receiving the ends of the rods and means for fastening the rod ends in said sleeves, said sleeves being secured to some of the wheel supported frame sections.

5. A trackless mobile conveyor as set forth in claim 4 characterized by stiffening members loosely mounted in and extending across a plurality of said frame sections.

6. A trackless mobile conveyor as set forth in claim 4 characterized by means slidably mounted in said frame sections for regulating the flexing of said drawbar.

References Cited in the file of this patent

UNITED STATES PATENTS

| | | |
|---|---|---|
| 1,548,278 | Phillips et al. | Aug. 4, 1925 |
| 1,826,853 | Williams et al. | Oct. 13, 1931 |
| 1,933,404 | Allen et al. | Oct. 31, 1933 |
| 2,168,898 | Christensen et al. | Aug. 8, 1939 |
| 2,250,933 | Manierre | July 29, 1941 |
| 2,525,555 | Manierre | Oct. 10, 1950 |
| 2,674,364 | Cartlidge | Apr. 6, 1954 |

FOREIGN PATENTS

| | | |
|---|---|---|
| 361,022 | Germany | Oct. 9, 1922 |
| 603,291 | Germany | Sept. 26, 1934 |
| 902,569 | France | Dec. 15, 1944 |
| 611,784 | Great Britain | Nov. 3, 1948 |
| 1,014,507 | France | June 18, 1952 |